N. McCUEN.
Harrow.
No. 34,516.                                     Patented Feb. 25. 1862.
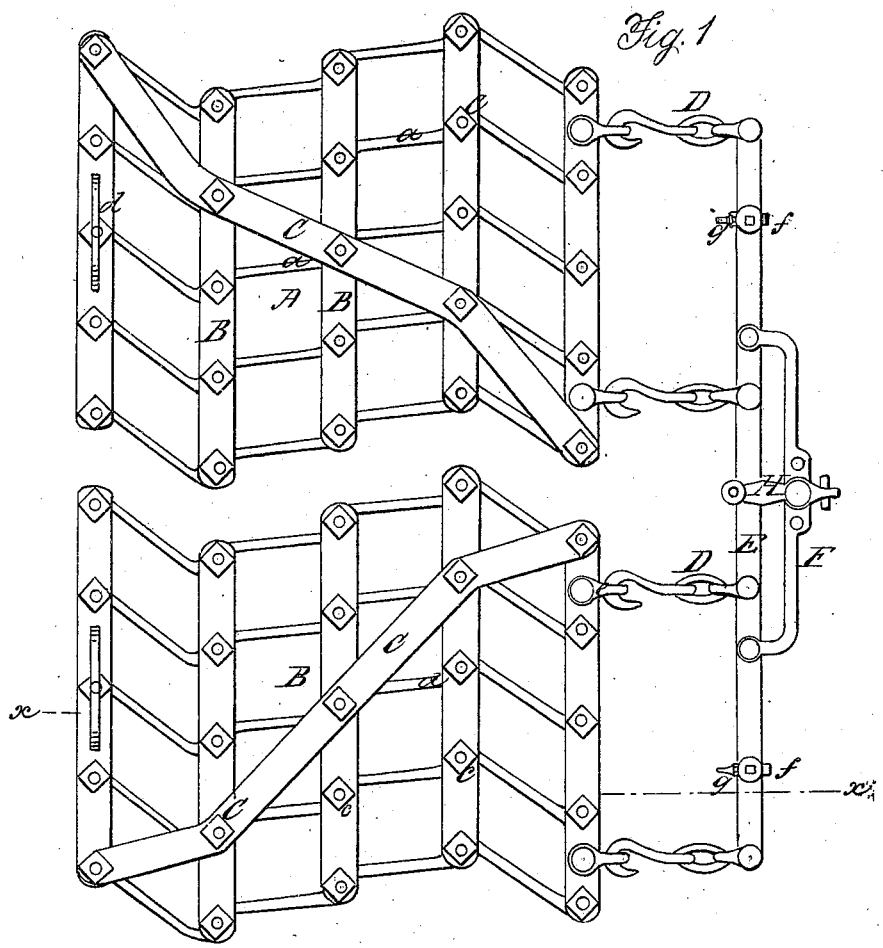
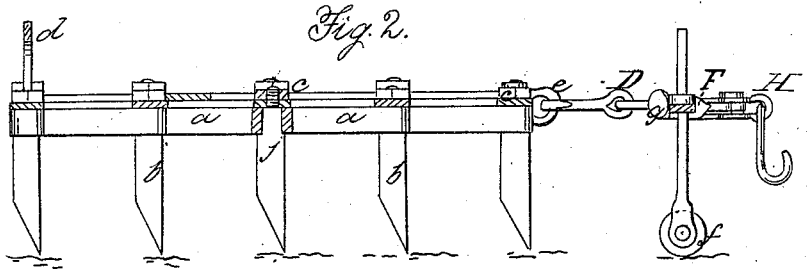
Witnesses:
J. Coombs
G. W. Reed
Inventor
Nelson McCuen
her Munn & Co
Attorneys

UNITED STATES PATENT OFFICE.

NELSON McCUEN, OF SOUTH POTSDAM, NEW YORK.

IMPROVEMENT IN HARROWS.

Specification forming part of Letters Patent No. 34,516, dated February 25, 1862.

*To all whom it may concern:*

Be it known that I, NELSON McCUEN, of South Potsdam, in the county of St. Lawrence and State of New York, have invented a new and Improved Self-Adjusting Drag; and I do hereby declare the following to be a full, clear, and exact description of the same, reference being had to the accompanying drawings, making a part of this specification, in which—

Figure 1 is a plan or top view of my invention. Fig. 2 is a longitudinal section of the same, taken at the line $x\ x$ of Fig. 1.

Similar letters of reference indicate corresponding parts in the two figures.

The object of this invention is to obtain an implement which will open up the soil and work the ground into a perfect tilth by being passed over it simply once.

To enable others skilled in the art to fully understand and construct my invention, I will proceed to describe it.

The frames A B, to which the teeth are secured, consist of a series of bars, $a$, which are secured together at the proper and equal distances apart by the cross-ties B. The bars $a$ are bent so as to form obtuse angles, as plainly shown in Fig. 1 in the drawings, and the teeth $b$ are secured to the frames by means of nuts, $c$, which at the same time fasten the cross-ties B down on the bars $a$. The cross-ties at the ends of the frames may be wider and stronger than the rest. Each of the frames of the implement are strengthened by a diagonal curved binder, C, which is fastened down on the same by the nuts $c$, as plainly shown in Fig. 1 of the drawings. The frames are provided with handles at their hind end, and are connected by means of chains D with the beam or evener E, said chains being secured to the cross-ties by means of half-ring bolts $e$, or in any other suitable manner. The beam E rests on rollers $f$, which are adjustable in a vertical direction by means of set-screws $g$, so that the height of the evener E can be regulated according to the nature of the soil, and thus the proper line of draft between the shoulders of the drawing-animals and the evener E can always be maintained by simply changing the height of the wheel. The wheel also serves to support the weight of the evener and prevents it from depressing the front end of the drag.

F is an arm attached at each end to the beam E. The clevis H, to which the draft-animals are hitched, is attached to the arm F, and can be adjusted laterally thereon by means of the holes $h$ in the middle of the bar, so that the driver is enabled to change the angle at which the drag is drawn, so as to cause the teeth to assume a sidewise position as they pass through the ground, whereby the teeth will act like plowshares and turn the earth over in small furrows. This is especially useful in what is termed "sward"-ground.

When it is desired to use either one of the frames separate for one horse or other draft-animal the adjustable beam is taken off and the draft-animal hitched to the front cross-tie of the frame by means of the half-ring bolts.

The teeth of the implement are steel-faced, and they may be shaped in such a manner as to be self-sharpening. The shoulders $j$ on their upper ends serve to give to the same a good hold in the frames.

The frames, being connected independently to the adjustable beam, can be lifted for any purpose while the implement is in motion, and the easy and independent up-and-down movement enables them to adapt themselves to the surface of the ground.

Having thus described my invention, what I claim as new, and desire to secure by Letters Patent, is—

A drag having the evener E, supported upon adjustable rollers, and having the bars $a$, bent at obtuse angles to the bars B, the teeth being arranged to said bars as set forth, and the whole constructed otherwise as herein shown and described.

NELSON McCUEN.

Witnesses:
JAMES ELLWOOD,
ROBERT CHAMBERS.